United States Patent [19]

Spencer

[11] Patent Number: 5,591,954
[45] Date of Patent: Jan. 7, 1997

[54] APPARATUS AND METHOD FOR EQUALIZING THE SIGNAL STRENGTHS OF DIFFERENT SCAN LINES

[75] Inventor: Michael A. Spencer, Lawrenceville, Ga.

[73] Assignee: AT&T Global Information Solutions Company, Dayton, Ohio

[21] Appl. No.: 392,596

[22] Filed: Feb. 23, 1995

[51] Int. Cl.⁶ .................................................. G06K 7/10
[52] U.S. Cl. ........................................ 235/467; 359/585
[58] Field of Search ......................... 235/467; 250/236; 359/201, 212, 216, 583, 584, 585

[56] References Cited

U.S. PATENT DOCUMENTS

| | | | |
|---|---|---|---|
| 3,988,573 | 10/1976 | Hayosh et al. ................... | 235/61.11 E |
| 4,064,390 | 12/1977 | Hildebrand et al. .................. | 235/470 |
| 4,093,865 | 6/1978 | Nickl ........................................ | 250/566 |
| 4,123,134 | 10/1978 | Meyers ................................. | 250/252 X |
| 4,652,732 | 3/1987 | Nickl ........................................ | 235/462 |
| 4,794,240 | 12/1988 | Schorr et al. ............................ | 235/467 |
| 4,799,164 | 1/1989 | Hellekson et al. ...................... | 235/467 |
| 4,870,274 | 9/1989 | Hebert et al. ............................ | 250/236 |
| 4,882,476 | 11/1989 | White ...................................... | 235/462 |
| 5,155,343 | 10/1992 | Chandler et al. ....................... | 235/462 |
| 5,216,232 | 6/1993 | Knowles et al. ........................ | 235/467 |
| 5,231,277 | 7/1993 | Aritake et al. ........................... | 235/462 |
| 5,288,983 | 2/1994 | Nakazawa ............................... | 235/462 |
| 5,296,689 | 3/1994 | Reddersen et al. ..................... | 235/467 |
| 5,475,207 | 12/1995 | Bobba et al. ............................ | 235/467 |

Primary Examiner—Donald T. Hajec
Assistant Examiner—Steven Wigmore
Attorney, Agent, or Firm—Paul W. Martin

[57] ABSTRACT

An apparatus and method for equalizing the signal strengths of different scan lines which employs an attenuating mirror. The attenuating mirror attenuates a laser beam and reflected light from an article at an attenuation which is different from the attenuation of another pattern mirror so that reflected light from the one and the other pattern mirror have intensities which are substantially equal, within a predetermined range of intensities having a low end equal to a signal-to-noise threshold and a high end equal to a saturation level.

13 Claims, 3 Drawing Sheets

APPARATUS AND METHOD FOR EQUALIZING THE SIGNAL STRENGTHS OF DIFFERENT SCAN LINES

BACKGROUND OF THE INVENTION

The present invention relates to optical bar code scanners, and more specifically to an apparatus and method for equalizing the signal strengths of different scan lines.

Optical scanners are well known for their usefulness in retail checkout and inventory control. Optical scanners generally employ a single laser source, the light from which is collimated and focused to produce a scanning beam. They may additionally employ a mirrored spinner to direct the beam against a plurality of stationary mirrors, and a detector to collect the beam after it is reflected by a bar code label. The pattern produced by such a scanner is characterized by lines oriented at various angles to one another.

A problem with the typical optical scanner is that scan lines from different pattern mirrors have different field strengths and produce returning light beams which have different signal strengths at the photodetector. This difference in field strength is caused by many factors, including differences in the incidence angles at the pattern mirrors and at the aperture glass. Collected laser power may vary by as much as 30%.

Mirrors used in optical scanners are evaporated coated first surface mirrors. The factors which determine the amount of reflectance are substrate type and flatness, and coating material and thickness. Typical scanners employ mirrors coated with aluminum or gold, which produce the highest reflectance for the light wavelengths used in these scanners.

Prior scanner designs are not equipped to process signals having strengths that are outside a predetermined range of signal strengths. The gain of signal processing circuitry must be set to amplify the weakest signals, but not to the point that stronger signals cause saturation. Signals that are too weak are not decoded. Signals that are too strong adversely affect the operation processing circuitry within the scanner.

Therefore, it would be desirable to provide an apparatus and method for equalizing the signal strengths of different scan lines to ensure that returning light from all of the scan lines is processed.

SUMMARY OF THE INVENTION

In accordance with the teachings of the present invention, an apparatus and method for equalizing the signal strengths of different scan lines is provided. The apparatus includes a pattern mirror which attenuates a laser beam and reflected light from an article at an attenuation which is different from the attenuation of another pattern mirror so that reflected light from the one and the other pattern mirror have intensities which are substantially equal, within a predetermined range of intensities having a low end equal to a signal-to-noise threshold and a high end equal to a saturation level.

It is accordingly an object of the present invention to provide an apparatus and method for equalizing the signal strengths of different scan lines.

It is another object of the present invention to provide an apparatus and method for equalizing the signal strengths of different scan lines which employs an attenuating mirror to reduce the signal strengths of stronger scan lines.

It is another object of the present invention to provide an apparatus and method for equalizing the signal strengths of different scan lines which reduces the maximum difference in signal strength between scan lines to fit within the detection and processing ranges of typical scanners.

BRIEF DESCRIPTION OF THE DRAWINGS

Additional benefits and advantages of the present invention will become apparent to those skilled in the art to which this invention relates from the subsequent description of the preferred embodiment and the appended claims, taken in conjunction with the accompanying drawings, in which:

DETAILED DESCRIPTION OF THE PREFERRED EMBODIMENT

Figure 1:
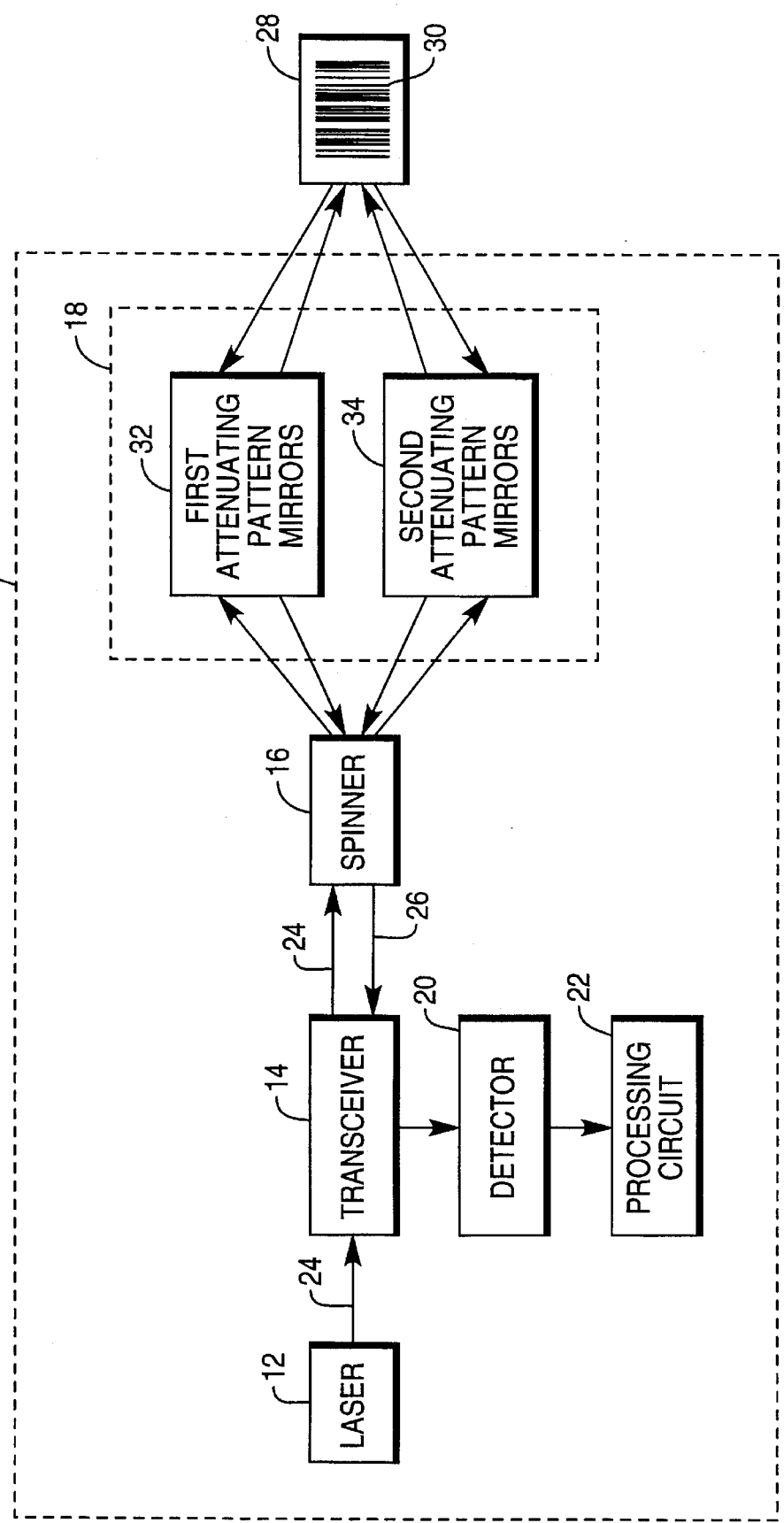
FIG. 1 is a block diagram of an optical scanner employing the apparatus of the present invention.

Referring now to FIG. 1, scanner 10 includes laser 12, optical transceiver 14, spinner 16, pattern mirrors 18, detector 20, and processing circuit 22.

Laser 12 is preferably a laser diode.

Optical transceiver 14 directs laser beam 24 to spinner 16 and directs light 26 reflected from an item 28 having a bar code label 30 to detector 20. Optical transceiver 14 is preferably a mirror with a hole in the middle.

Spinner 16 includes a plurality of mirrored facets which reflect laser beam 24 towards pattern mirrors 18.

Pattern mirrors 18 direct laser beam 24 to form a scan pattern. Pattern mirrors 18 preferably include first attenuating pattern mirrors 32 and second attenuating pattern mirrors 34.

First attenuating pattern mirrors 32 reduce the field strength of laser beam 24 and reflected light 26 for predetermined spinner angles to near the field strength of reflected light from second attenuating pattern mirrors 34.

Second attenuating pattern mirrors 34 direct laser beam 24 and reflected light 26 for spinner angles other than the predetermined spinner angles associated with the first attenuating pattern mirrors 32. Second attenuating patterns mirrors 34 preferably attenuate laser beam 24 and reflected light 26 very little or not at all.

Detector 20 converts reflected light 26 into electrical signals based upon the intensity of reflected light 26. The range of signal strengths of these electrical signals is narrower and the average signal strength is smaller with attenuation by first attenuating pattern mirrors 32 than without. The preferred range with attenuation is between 100 mv at the low end and 6000 mv at the top end.

Processing circuit 22 decodes the bar code information from the electrical signals. Since the range of signal strengths of the electrical signals is narrower from detector 20, processing circuit 22 may be more easily finely tuned so that all signals are decoded. Since the stronger signals have been attenuated, all signals may be amplified by processing circuit 22 by the same gain factor without saturating the processing circuitry. A lower signal-to-noise threshold (100 mv) may be set. If desired, the output power of laser 12 may increased to increase the average field strength of the scan lines to offset attenuation.

Figure 2:
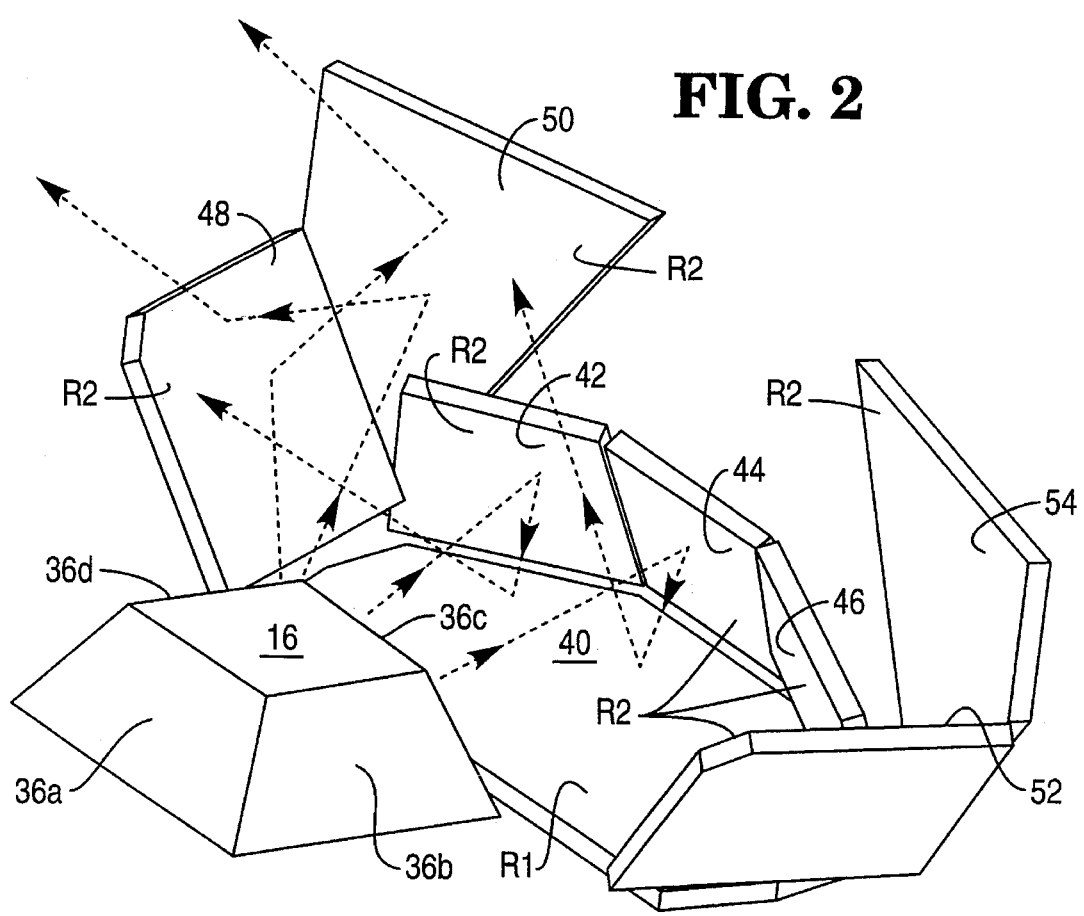
FIG. 2 is a perspective view of the mirrors within scanner of FIG. 1.
Figure 3A:
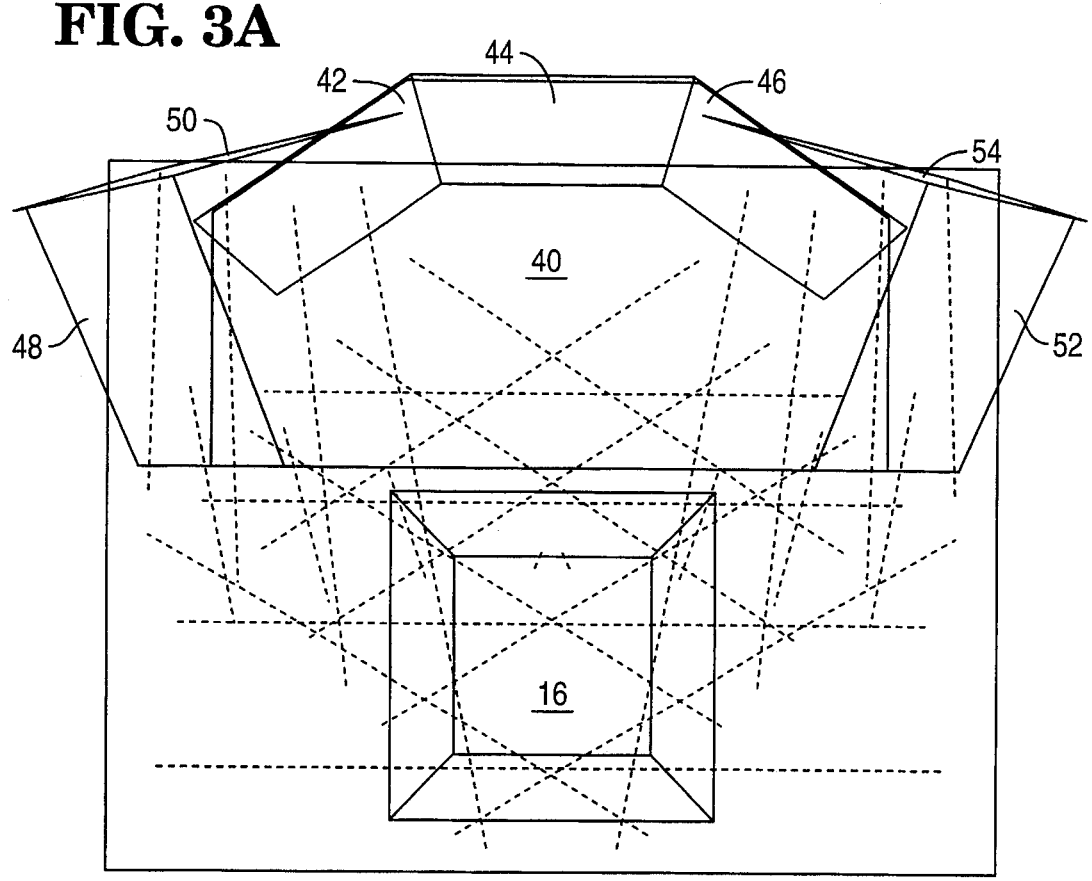
FIG. 3A is a top view of the mirrors of FIG. 2 with the resulting scan pattern and scanner aperture superimposed.
Figure 3B:
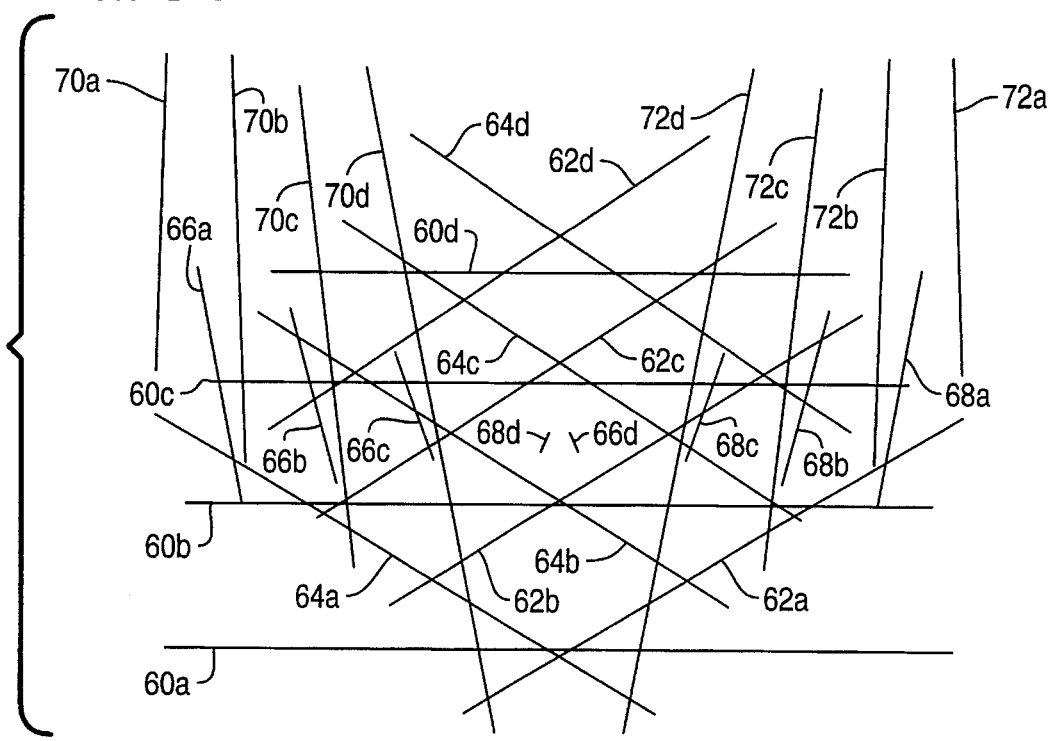
FIG. 3B is a view of the scan pattern from FIG. 3A.

Turning now to FIGS. 2 and 3A and 3B, an example configuration for scanner 10 is shown in more detail to illustrate the present invention.

Spinner 16 is shown here as a four-sided spinner, although other types of spinners are also envisioned. Facets 36a–d are inclined at different angles.

Scanner 10 includes one of first attenuating pattern mirrors 32, which is mirror 40. Mirror 40 has reflectivity R1.

Second attenuating pattern mirrors 34 include pattern mirrors 42–54. Mirrors 42–54 have reflectivity R2, which is greater than reflectivity R1.

In FIG. 2. only the center and left side rays are shown. The right side rays are left out for clarity. Given the symmetry of scanner 10, the right side rays for mirrors 46–354 can be derived from the left side rays.

Scanner 10 produces horizontal scan lines 60a–d, diagonal scan lines 62a–d and 64a–d, and vertical scan lines 66a–d, 68-a–d, 70a–d, and 72a–d. Laser beam 24 reflects from mirror 44 to mirror 40 to produce the horizontal scan lines 60a–d. Laser beam 24 reflects from mirror 42 to mirror 40 to produce one set of diagonal scan lines 62a–d. Laser beam 24 reflects from mirror 46 to mirror 40 to produce the another set of diagonal scan lines 64a–d. In each case, mirror 40 attenuates beam 24 and reflected light Laser beam 24 reflects from mirror 48 to mirror 50 to produce vertical scan lines 70a–d. Laser beam 24 reflects from mirror 52 to mirror 54 to produce vertical scan lines 72a–d. Laser beam 24 reflects from mirror 50 to mirror 48 to produce vertical scan lines 66a–d. Finally, laser beam 24 reflects from mirror 54 to mirror 52 to produce another set of vertical scan lines 68a–d.

Through experiment, it is known that the diagonal and horizontal scan lines 60a–d, 62a–d, and 64a–d produce stronger detector signals than the vertical scan lines 66a–d, 68a–d, 70a–d, and 72a–d. Thus, the pattern has uneven field strengths throughout its volume, which adversely affect the likelihood of reading a bar code label during a first scan. The weakness of the vertical scan lines 66a–d, 68a–d, 70a–d, and 72a–d is due to the low angle of incidence, or smear angle, of such lines with respect to the bar code label. Thus, vertical scan lines 66a–d, 68a–d, 70a–d, and 72a–d produce an elongated or elliptical beam print on the bar code label which results in weaker reflected light.

Under the preferred embodiment of the present invention, pattern mirror 40 attenuates laser beam 24 and reflected light 26 to substantially equalize the signal strength of the horizontal and diagonal scan lines 60a–d, 62a–d, and 64a–d with the signal strength of the vertical scan lines 66a–d, 68a–d, 70a–d, and 72a–d.

For this purpose, pattern mirrors 42–54 have an aluminum coating, which provides a reflectivity of about 92%. Pattern mirror 40 has a nickel or titanium coating which provides a reflectivity of about 70%. Thus, pattern mirror pairs 40 and 42, 40 and 44, and 40 and 46 each provide a combined attenuation of about 42%. Attenuation may be increased or decreased by varying the thickness of the coating or by adding other layers of materials.

The power of laser 12 may be increased by as much as 42% to offset the attenuation.

Although the present invention has been described with particular reference to certain preferred embodiments thereof, variations and modifications of the present invention can be effected within the spirit and scope of the following claims.

I claim:

1. A bar code scanner comprising:
   a plurality of pattern mirrors, including a first pattern mirror which attenuates and reflects a laser beam to produce a scan line for scanning an article, and a second pattern mirror which attenuates and reflects the laser beam at an attenuation different than the attenuation of the first pattern mirror to produce another scan line for scanning the article.

2. The scanner as recited in claim 1, in which the one scan line and the other scan line produce reflected lights which have intensities which are substantially equal.

3. The scanner as recited in claim 1, in which the one scan line and the other scan line produce reflected lights having intensities within a predetermined range of intensities bounded at a low end by a predetermined signal-to-noise threshold and bounded at a high end by a saturation level.

4. The scanner as recited in claim 1, wherein the first pattern mirror have an aluminum coating, which provides a reflectivity of about 92%.

5. The scanner as recited in claim 1, wherein the second pattern mirror has a nickel titanium coating which provides a reflectivity of about 70%.

6. The scanner as recited in claim 1, wherein the first pattern mirror directs the laser beam to the second pattern mirror.

7. The scanner as recited in claim 6, further comprising:
   a laser for producing the laser beam;
   a detector for converting light reflected from the article to the second pattern mirror and then to the first pattern mirror into electrical signals based upon the intensity of the reflected light;
   a mirrored spinner for directing the laser beam at the pattern mirrors and for directing the reflected light to the detector; and
   a processing circuit for amplifying the electrical signals and decoding the bar code label.

8. The scanner as recited in claim 7, wherein the mirrored spinner comprises:
   four mirrored facets.

9. The scanner as recited in claim 8, further comprising:
   a third pattern mirror which attenuates and reflects the laser beam at an attenuation substantially equal to the attenuation of the first pattern mirror and which avoids directing the laser beam to the second pattern mirror.

10. A bar code scanner comprising:
    a laser for producing the laser beam;
    a first pattern mirror which attenuates and reflects the laser beam;
    a second pattern mirror which attenuates the laser beam at an attenuation different than the attenuation of the first pattern mirror and which directs the laser beam at the first pattern mirror;
    a third pattern mirror which attenuates the laser beam at an attenuation equal to the attenuation of the second pattern mirror and which avoids directing the laser beam to the first pattern mirror;
    a detector for converting light reflected from an article to the second and third mirrors to electrical signals based upon the intensities of the reflected light, wherein the intensities are within a predetermined range of intensities bounded at a low end by a predetermined signal-to-noise threshold and bounded at a high end by a saturation level; and
    a mirrored spinner for directing the laser beam at the second and third pattern mirrors and for directing the reflected light to the detector; and a processing circuit for amplifying the electrical signals and decoding the bar code label.

11. A method for scanning a bar code label comprising the steps of:

(a) providing a laser beam;

(b) reflecting the laser beam by a first pattern mirror which attenuates the laser beam and which directs it at the bar code label;

(c) reflecting the laser beam by a second pattern mirror which attenuates the laser beam at an attenuation different than the attenuation of the first pattern mirror and which directs the laser beam at the bar code label and (d) converting light reflected from the bar code label and reflected from the first and second pattern mirrors to electrical signals based upon the intensities of the reflected light from each of the first and second pattern mirrors, wherein the intensities are within a predetermined range of intensities bounded at a low end by a predetermined signal-to-noise threshold and bounded at a high end by a saturation level.

12. An apparatus for equalizing the field strengths of first and second scan lines for scanning an article comprising:

a pattern mirror which attenuates and reflects a laser beam to produce the first scan line for scanning an article, and which receives and attenuates reflected light from the article;

wherein the pattern mirror has an attenuation greater than the attenuation of another pattern mirror that produces the second scan line; and wherein the pattern mirror and the other pattern mirror provide reflected lights having intensities which are substantially equal.

13. An apparatus for minimizing saturation of a processing circuit within an optical scanner comprising:

a pattern mirror which attenuates and reflects a laser beam to produce a scan line for scanning an article, and which receives and attenuates reflected light from the article;

wherein the pattern mirror has an attenuation greater than the attenuatiion of another pattern mirror that produces a scan line; and wherein the pattern mirror and the other pattern mirror provide reflected lights having intensities within a predetermined range of intensities bounded at a low end by a predetermined signal-to-noise threshold and bounded at a high end by a saturation level.

* * * * *